US012547467B2

(12) United States Patent
Miller et al.

(10) Patent No.: US 12,547,467 B2
(45) Date of Patent: Feb. 10, 2026

(54) METHOD TO OPTIMIZE STORAGE PARTITION REDISCOVERY

(71) Applicant: DELL PRODUCTS L.P., Round Rock, TX (US)

(72) Inventors: Joel Miller, Vacaville, CA (US); Paul Nehse, Livermore, CA (US); Michael Thiels, San Martin, CA (US); Nassireddine El Yahfoufi, Georgetown, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 672 days.

(21) Appl. No.: 17/727,641

(22) Filed: Apr. 22, 2022

(65) Prior Publication Data

US 2023/0342215 A1    Oct. 26, 2023

(51) Int. Cl.
*G06F 9/50*     (2006.01)
*G06F 9/30*     (2018.01)
*G06F 9/54*     (2006.01)

(52) U.S. Cl.
CPC ........ *G06F 9/5061* (2013.01); *G06F 9/30069* (2013.01); *G06F 9/30192* (2013.01); *G06F 9/545* (2013.01)

(58) Field of Classification Search
CPC ............... G06F 9/5061; G06F 9/30069; G06F 9/30192; G06F 9/545; G06F 3/0604; G06F 3/0632; G06F 3/067; G06F 3/0673; G06F 3/0644
See application file for complete search history.

(56) References Cited

U.S. PATENT DOCUMENTS

| | | | |
|---|---|---|---|
| 8,225,009 B1 * | 7/2012 | Nayak | G06F 3/0632 710/36 |
| 10,976,950 B1 * | 4/2021 | Trezzo | G06F 3/0652 |
| 2002/0147900 A1 * | 10/2002 | Tashiro | G06F 3/0632 711/112 |

(Continued)

FOREIGN PATENT DOCUMENTS

CN        105446772 A   *   3/2016

OTHER PUBLICATIONS

Alessandro Rubini & Jonathan Corbet, Linux Device Drivers, O'reilly, 2nd Edition, Chapter 12, from pp. 321 to pp. 369 (Year: 2001).*

*Primary Examiner* — Chat C Do
*Assistant Examiner* — Tuan M Nguyen
(74) *Attorney, Agent, or Firm* — WOMBLE BOND DICKINSON (US) LLP (57) ABSTRACT

Disclosed is a storage management system comprising: sending, by a user device manager running at a user space of an operating system, a first request for partition table data to a block device; receiving, by the user device manager, first partition data of the block device; sending, by the user device manager, a second request for partition data of the block device to a kernel of the operating system; receiving, by the user device manager, second partition data from the kernel, wherein the second partition data is associated with the block device and cached by the kernel; determining whether the first partition data and the second partition data are identical; and in response to determining that the first partition data is different from the second partition data, performing a device discovery operation on the block device.

20 Claims, 7 Drawing Sheets

(56) References Cited

U.S. PATENT DOCUMENTS

| | | | | |
|---|---|---|---|---|
| 2008/0271031 A1* | 10/2008 | Herington | ............... | G06F 9/485 |
| | | | | 718/104 |
| 2012/0117367 A1* | 5/2012 | Lu | ........................ | G06F 9/4401 |
| | | | | 713/2 |
| 2015/0309901 A1* | 10/2015 | Pershin | ..................... | G06F 3/06 |
| | | | | 714/6.3 |
| 2018/0357133 A1* | 12/2018 | Strogov | .................. | G06F 21/80 |
| 2020/0081640 A1* | 3/2020 | Enz | ..................... | G06F 13/4027 |
| 2021/0089684 A1* | 3/2021 | Cui | ..................... | G06F 21/6218 |
| 2021/0208808 A1* | 7/2021 | Gupta | ................... | G06F 3/0673 |

* cited by examiner

METHOD TO OPTIMIZE STORAGE PARTITION REDISCOVERY

FIELD OF THE INVENTION

Embodiments of the present application relate generally to data storage systems. More particularly, embodiments of the application relate to optimizing the storage partition rediscovery.

BACKGROUND

Block devices such as sub-systems need a discovery-operation to update recently added or removed block-partitions. Discovery-operations also allow the system to reflect changes in the user-space device files. For example, when invoking this discovery-operation on a large storage sub-system running operating system or OS (e.g., Linux OS), the current Linux implementation will generate a large number of events, up to 8 per partition, but it might end up dropping some of those events, causing discrepancies between user-space device files and actual devices on the system. These discrepancies will manifest in either Linux still showing a device-file while the corresponding block-partition had already been removed, or Linux having a block-partition that failed to add the corresponding device-file. The probability of this scenario occurring increases on large storage sub-systems where the discovery-operation causes thousands of events to flood the system, thus increasing the likelihood of dropped events.

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to the existing technology, OS (e.g. Linux) was built for a server with a handful of devices, not for a system with 1000 devices or more. For this reason, it would make sense for Linux to issue a discovery or bus scanning request such as a BLKRRPART IOCTL for all devices in the system as a form of (re)discovery. The Linux legacy solution is not scalable. Issuing the BLKRRPART IOCTL for all devices on a system with hundreds or close to a thousand devices is causing the following problems.

Further, the Netlink socket has limited resources. Flooding it with 1000's of "Add"/"Remove" events can cause some events to be dropped and subsequently causing discrepancies between the actual device partitions and between the corresponding user-space device files.

Furthermore, most devices during rescan have no change in their configuration. Thus, for those devices it is simply a performance degradation and waste of time to remove/add the kernel cache entries, which sends "Remove"/"Add" events on the Netlink socket, triggering udevd to remove/add the corresponding user-space device file.

Embodiments of the disclosure are related to an apparatus, method, and system for optimizing the storage partition rediscovery. In particular, this disclosure covers the design and implementation for the storage partition rediscovery that will be used on a large scale. Since many of systems have 300 or more drives connected. For the High Availability configurations, the failover process can greatly benefit from a streamlined (re)discovery mechanism. This will effectively maximize the system availability because it reduces the time and effort that the surviving node requires, in order to take over the storage, in case of an active node failure.

Figure 1:
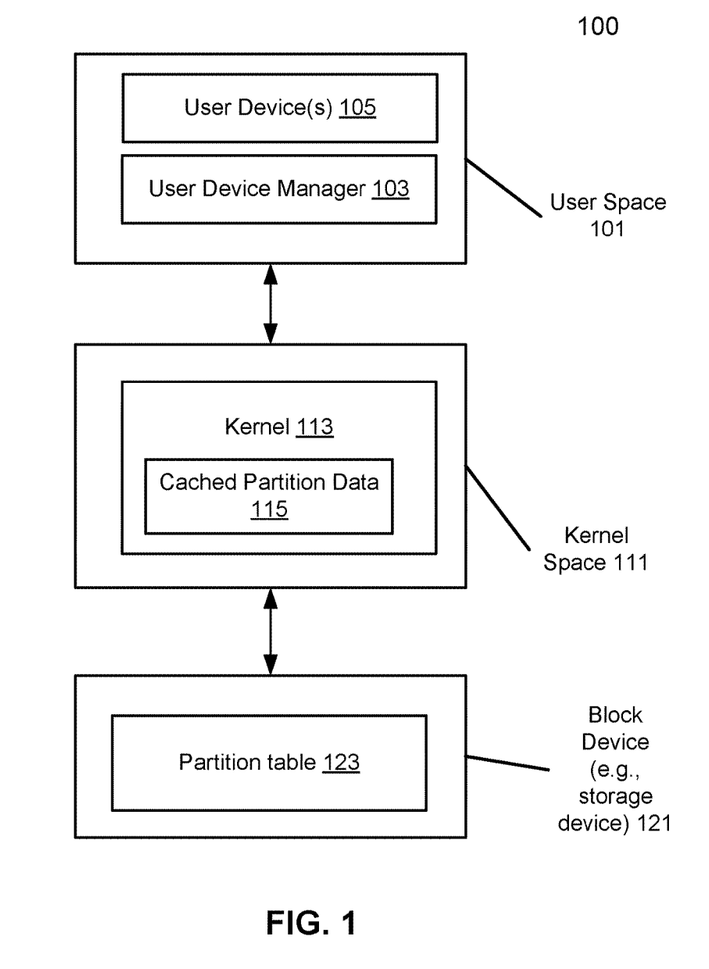
FIG. 1 is a block diagram illustrating a storage management system, according to an embodiment of the application.

FIG. 1 shows a block diagram illustrating a storage management system, according to an embodiment of the application. In particular, FIG. 1 shows storage management system 100 for optimizing the storage partition rediscovery according to an embodiment of the application. In an embodiment, storage management system 100 includes user space 101, kernel space 111, and block device 121. For example, user space 101 includes one or more user devices 105 and user device manager 103, Kernel space 111 includes kernel 113 and cached partition data 115, and block device 121 (e.g., a storage device) includes partition table 123. User devices 105 may be device representations representing the hardware devices such as block device 121.

In an embodiment, user device manager 103 at a user space 101 of an operating system sends a first request for partition table data 123 to block device 121. For example, such as request may be triggered during initialization of a computer system, such as, for example, a bus numeration operation. Alternatively, when a hard device is inserted onto or removed from a bus (e.g., plug and play action), the bus renumeration operation is triggered to discover any update of devices coupled to the bus. In this example, user device manager 103 communicate with block device 121 in an attempt to discover whether there is any update on block device 121 such as any update on partitions. User device manager 103 is configured to retrieve partition data from block device 121.

In addition, user device manager 103 sends a second request for partition data 115 of the block device 121 to kernel 113 of the operating system. Typically, kernel 113 maintains or cache a copy of partition data of block device 121 periodically. Next, user device manager 103 receives second partition data 115 from kernel 113, and second partition data 115 is associated with block device 121 and cached by kernel 113 according to an embodiment of the application. Furthermore, in an embodiment, user device manager 103 determines whether first partition data 123 and second partition data 115 are identical. In general, if there is any change on the block device 121, the partition data retrieved from block device 121 and the partition data obtained from the kernel may be different. As a result, a device discovery or bus enumeration may be performed. Next, in an embodiment, in response to determining that first partition data 123 is different from second partition data 115, user device manager 103 performs a device discovery operation on block device 121. In addition, in an embodiment, in response to determining that first partition data 123 and second partition data 115 are identical, user device manager 103 skips the discovery operation on block device 121.

In an embodiment, first partition data 123 includes a first name and first description to block device 121. Further, second partition data 115 includes a second name and second description associated with block device 121 cached by the kernel 113. Note that a storage device may include one or more partitions (e.g., storage volumes). The storage device maintains a partition table, where the partition table includes one or more partition entries, each partition entry corresponding to a particular partition. A partition table is a special table that is divided into segments, called partitions, that makes it easier to manage and query data.

Disk partitioning or disk slicing is the creation of one or more regions on secondary storage, so that each region can be managed separately. These regions are called partitions. It is typically the first step of preparing a newly installed disk, before any file system is created. The disk stores the information about the partitions' locations and sizes in an area known as the partition table that the operating system reads before any other part of the disk. Each partition then appears to the operating system as a distinct "logical" disk (e.g., user devices 105) that uses part of the actual disk. Partitioning allows the use of different file systems to be installed for different kinds of files. Separating user data from system data can prevent the system partition from becoming full and rendering the system unusable. Partitioning can also make backing up easier.

Furthermore, determining whether first partition data 123 and second partition data 115 are identical, further comprising comparing the first name and the first description of first partition data 123 to block device 121 to the second name and the description of second partition data 115 associated with block device 121 cached by the kernel 113.

In addition, when the first name and the first description of first partition data 123 to block device 121 matches the second name and the second description of second partition data 115 associated with block device 121 cached by kernel 113 based on the comparison, first partition data 123 and second partition data 115 are identical. Otherwise, when the first name and the first description of first partition data 123 to block device 121 do not match the second name and the second description of second partition data 115 associated with block device 121 cached by the kernel 113 based on the comparison, first partition data 123 and second partition data 115 are not identical.

Figure 2:
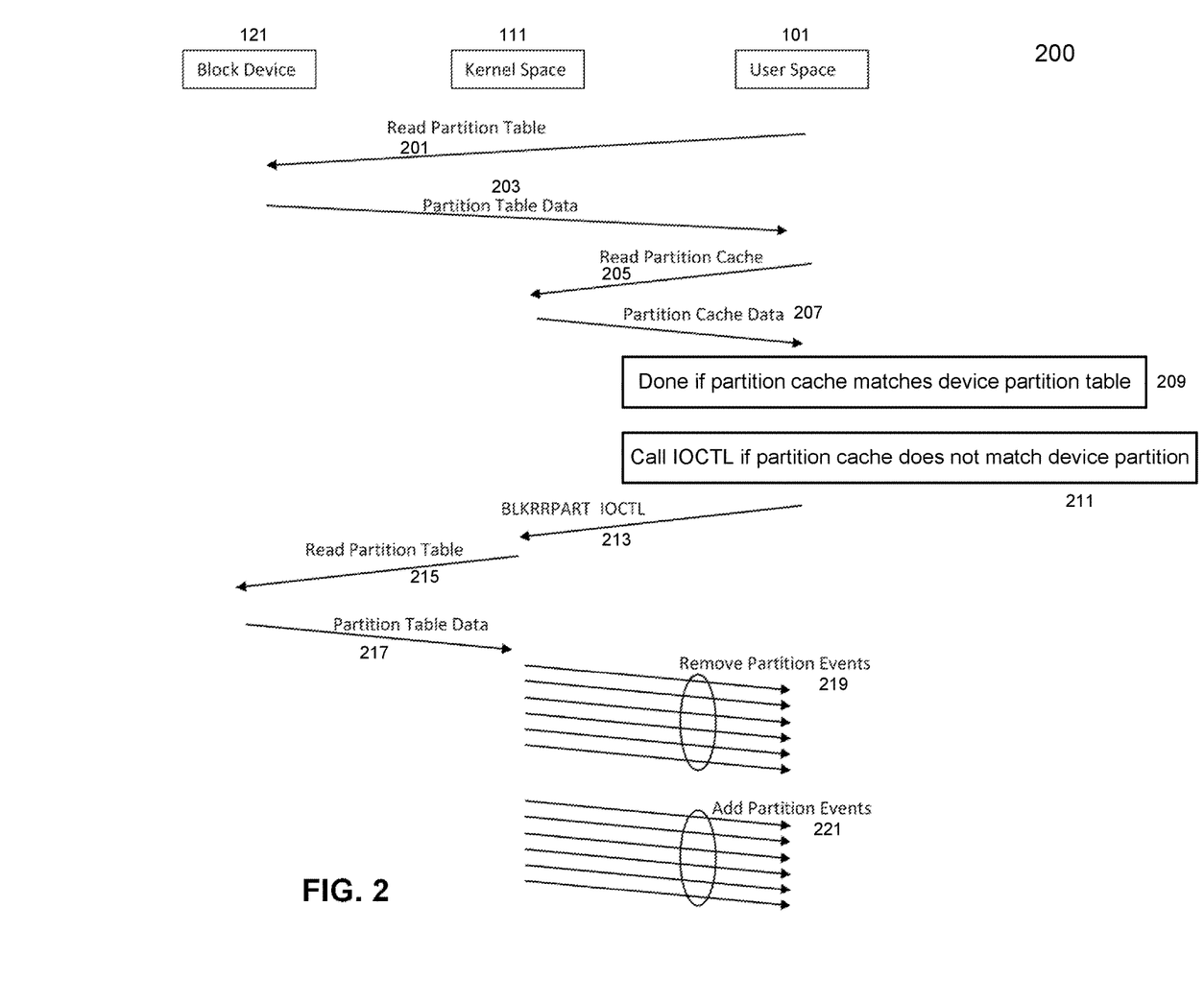
FIG. 2 is a block diagram illustrating a process of a storage management system, according to an embodiment of the application.

FIG. 2 shows a block diagram illustrating a process of a storage management system, according to an embodiment of the application. In particular, FIG. 2 shows process 200 for optimizing the storage partition rediscovery according to an embodiment of the application.

For example, at operation 201, user device manager 103 at a user space 101 of an operating system sends a first request to read partition table data 123 to block device 121 according to an embodiment of the application.

At operation 203, user device manager 103 receives first partition data 123 of block device 121 according to an embodiment of the application.

At operation 205, user device manager 103 sends a second request for partition data 115 of the block device 121 to kernel 113 of the operating system according to an embodiment of the application.

At operation 207, user device manager 103 receives second partition data 115 from kernel 113, and second partition data 115 is associated with block device 121 and cached by kernel 113 according to an embodiment of the application.

At operations 209, 211, user device manager 103 determines whether first partition data 123 and second partition data 115 are identical according to an embodiment of the application. At operations 209, in response to determining that first partition data 123 and second partition data 115 are identical, user device manager 103 skips the discovery operation on block device 121 according to an embodiment of the application.

At operations 211, in response to determining that first partition data 123 is different from second partition data 115, user device manager 103 performs a device discovery operation on block device 121 according to an embodiment of the application. That is, user device manager 103 performs a device discovery operation on block device 121 by calling IOCTL if first partition data 123 is different from second partition data 115.

Next, at operations 213, user device manager 103 sends BLKRRPART IOCTL to kernel space 111. At operation 215, kernel 113 reads partition table data 123 of block device 121. Next, at operation 213, kernel 113 acquires partition table data 123 associated with block device 121. For example, during (re)discovery, Linux issues the BLKRRPART IOCTL for every single device on the storage subsystem, in order to implement the discovery-operation required if even only one partition in the whole system has changed. This is especially true on High Availability large systems where one node makes partition changes to one or more shared storage device(s), and the other node(s) are required to update their device files/information to match the actual devices on the large system.

At operation 219, 211, based on the acquired partition table data 123 associated with block device 121, the user device manager 103 performs one or more remove-partition-events 219 and one or more add-partition-events 221 to modify the partition table data of the block device 121 stored in the user space 101.

Here is the workflow on legacy Linux for a single BLKRRPART IOCTL according to an embodiment of the application.

Kernel 113 removes from its cache 115 all existing partition entries for that device (e.g., block device 121). Kernel 113 keeps cache 115 that maps each device (e.g., block device 121) on the system with the partitions on that device (e.g., block device 121) according to an embodiment of the application.

For each partition removed (e.g., at operation 219), Kernel 113 posts a "remove" event onto a UDP socket, called the Netlink socket according to an embodiment of the application.

For each "remove" event, a user space daemon, udevd, removes the corresponding user space device file. 4-Kernel re-reads the actual partition table from the device (e.g., block device 121) according to an embodiment of the application.

For each partition (re)discovered for that device (e.g., block device 121), kernel 113 adds a new entry in its cache 115 according to an embodiment of the application.

For each new entry in its cache, kernel 113 posts an "Add" event onto the Netlink UDP socket according to an embodiment of the application.

For each "Add" event (e.g., at operation 221), the user space daemon, udevd, adds the corresponding user space device file according to an embodiment of the application.

It should be noted, according to the current way, the above operations 213-221 are performed without regard to whether or not kernel space cache already matches the partition table on the device. On a system with 1000 devices×6 partitions per device, the legacy Linux implementation may cause 6000 remove and 6000 add events for a rescan, even in the case where only one device has been updated.

The solution the present disclosure is proposing eliminates the unnecessary Add/Remove events by replacing the current legacy rescan for each device on the system, with this flow, which we can name it the ENHANCED_DISCOVERY workflow as below.

(1) Read the kernel space cache partition entries for the device. (2) Scan the partition information from the device directly.

Next, compare the device partitions found in (1) with the same device partitions found in (2).

If they match, finish for the current device, and proceed to the next device.

If they do not match, fall back into workflow of the Legacy Linux by calling the BLKRRPART IOCTL for this device to force the update to occur as usual.

It should be noted that in this case, the udev events will be generated only for the device that has an actual change in its partition table. Therefore, in the case with a system including 1000 devices, and 6 partitions per device, where one device changed its partition table, there will be 12 udev events generated instead of the 12000 udev events generated with the legacy Linux implementation.

Figure 3:
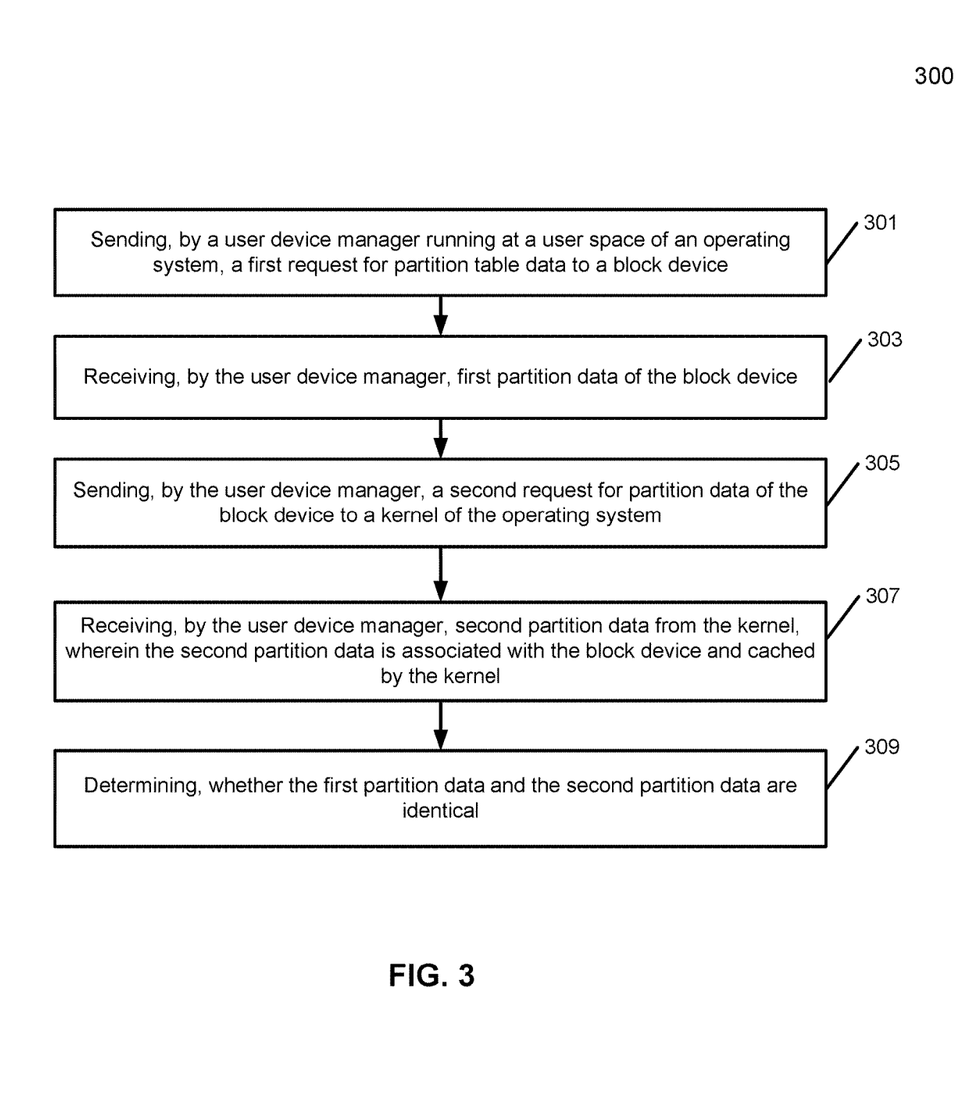
FIG. 3 is a flowchart illustrating a process for a storage management system to perform storage partition rediscovery, according to an embodiment of the application.

FIG. 3 is a flowchart illustrating a process for a storage management system to perform storage partition rediscovery, according to an embodiment of the application. In particular, FIG. 3 is a flowchart illustrating a storage management system 300 for optimizing storage partition rediscovery, according to an embodiment of the application.

At operation 301, user device manager 103 at a user space 101 of an operating system sends a first request to read partition table data 123 to block device 121 according to an embodiment of the application.

At operation 303, user device manager 103 receives first partition data 123 of block device 121 according to an embodiment of the application.

At operation 305, user device manager 103 sends a second request for partition data 115 of the block device 121 to kernel 113 of the operating system according to an embodiment of the application.

At operation 307, user device manager 103 receive second partition data 115 from kernel 113, and second partition data 115 is associated with block device 121 and cached by kernel 113 according to an embodiment of the application.

At operations 309, user device manager 103 determines if first partition data 123 matches second partition data 115 according to an embodiment of the application.

Figure 4:
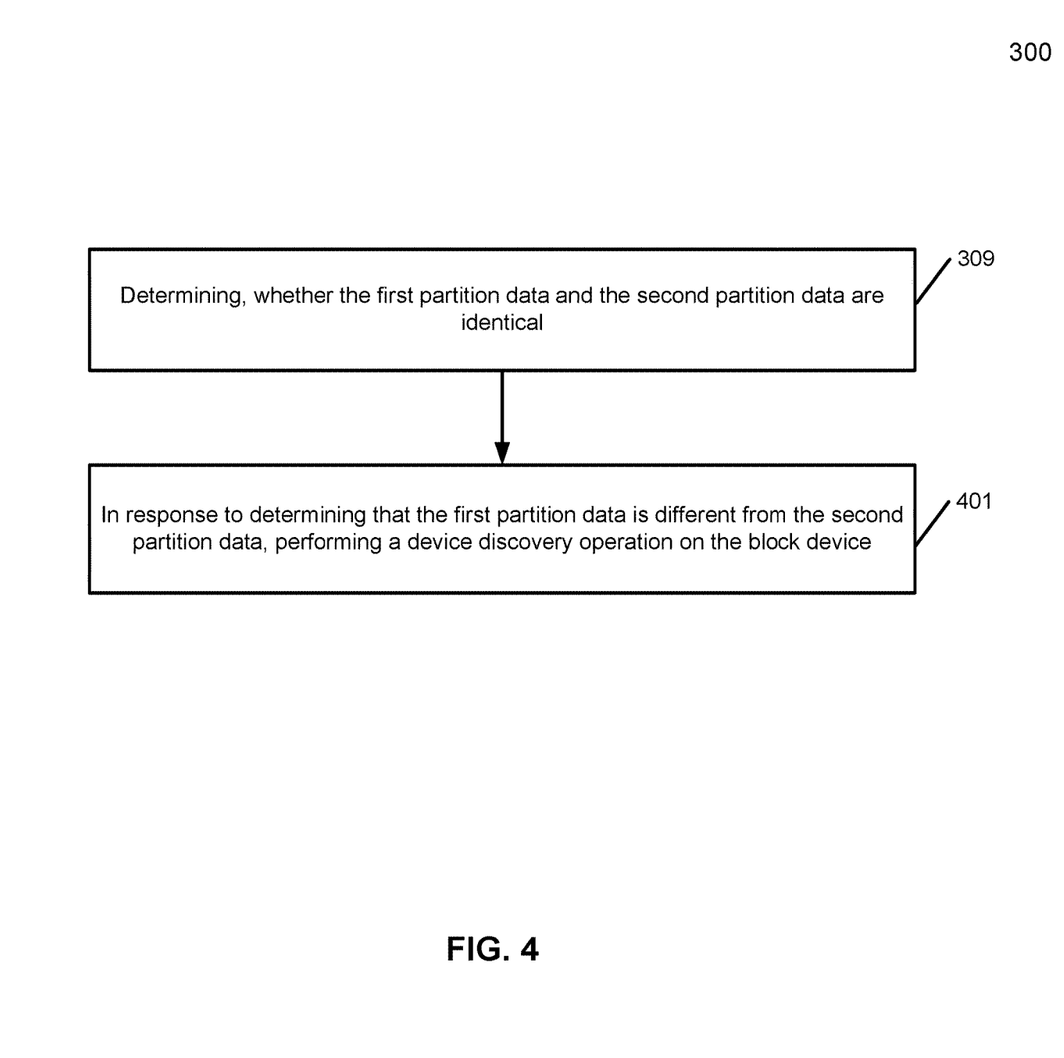
FIG. 4 is a flowchart illustrating a process for a storage management system to perform storage partition rediscovery, according to an embodiment of the application.

FIG. 4 is a flowchart illustrating a process for a storage management system to perform storage partition rediscovery, according to an embodiment of the application. In particular, FIG. 4 is a flowchart illustrating a storage management system 400 for optimizing storage partition rediscovery, according to an embodiment of the application.

As mentioned above, at operations 309, user device manager 103 determines whether first partition data 123 and second partition data 115 are identical or not according to an embodiment of the application.

Next, at operation 401, user device manager 103 skips the discovery operation on block device 121 in response to determining that first partition data 123 and second partition data 115 are identical according to an embodiment of the application.

Figure 5:
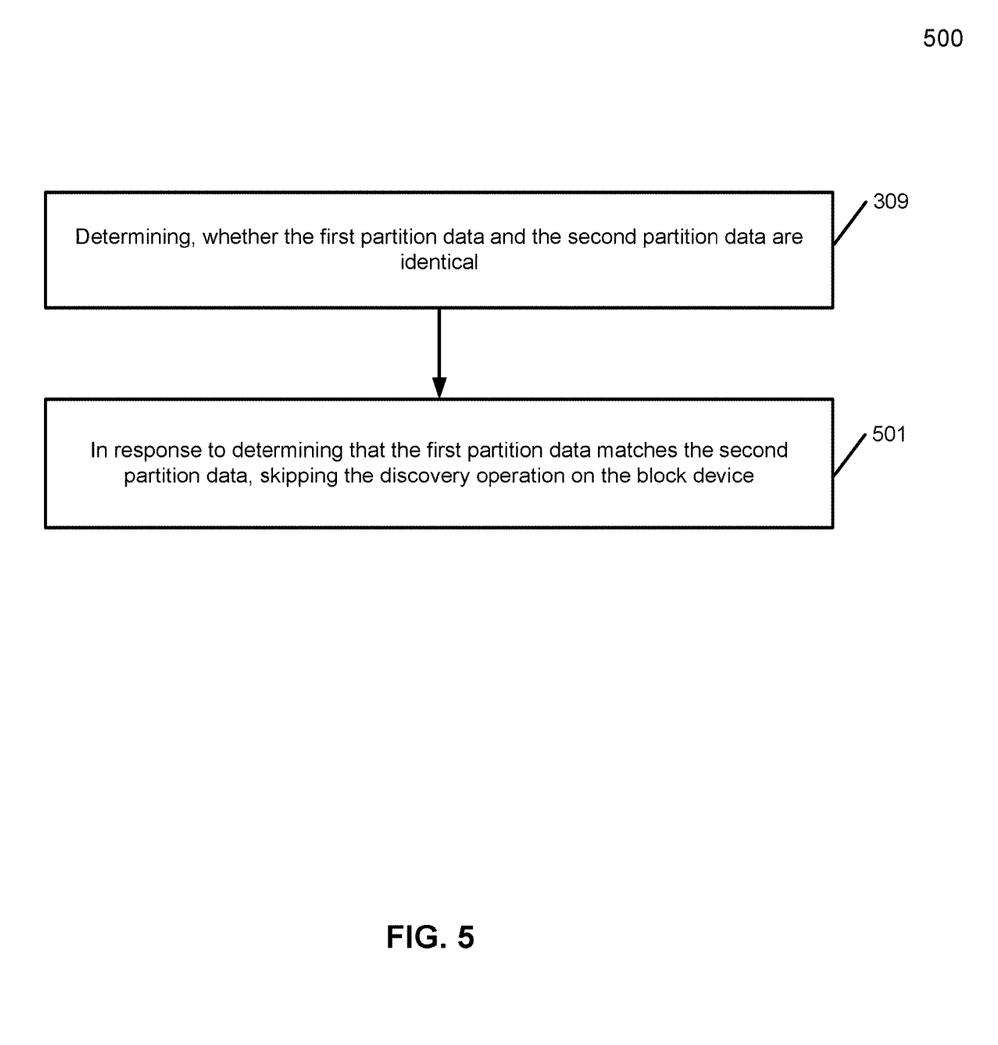
FIG. 5 is a flowchart illustrating a process for a storage management system to perform storage partition rediscovery, according to an embodiment of the application.

FIG. 5 is a flowchart illustrating a process for a storage management system to perform storage partition rediscovery, according to an embodiment of the application. In particular, FIG. 5 is a flowchart illustrating a storage management system 500 for optimizing storage partition rediscovery, according to an embodiment of the application.

As mentioned above, at operations 309, user device manager 103 determines if first partition data 123 and second partition data 115 are identical according to an embodiment of the application.

Next, at operation 501, user device manager 103 skips the discovery operation on block device 121 in response to determining that first partition data 123 matches second partition data 115 according to an embodiment of the application.

Figure 6:
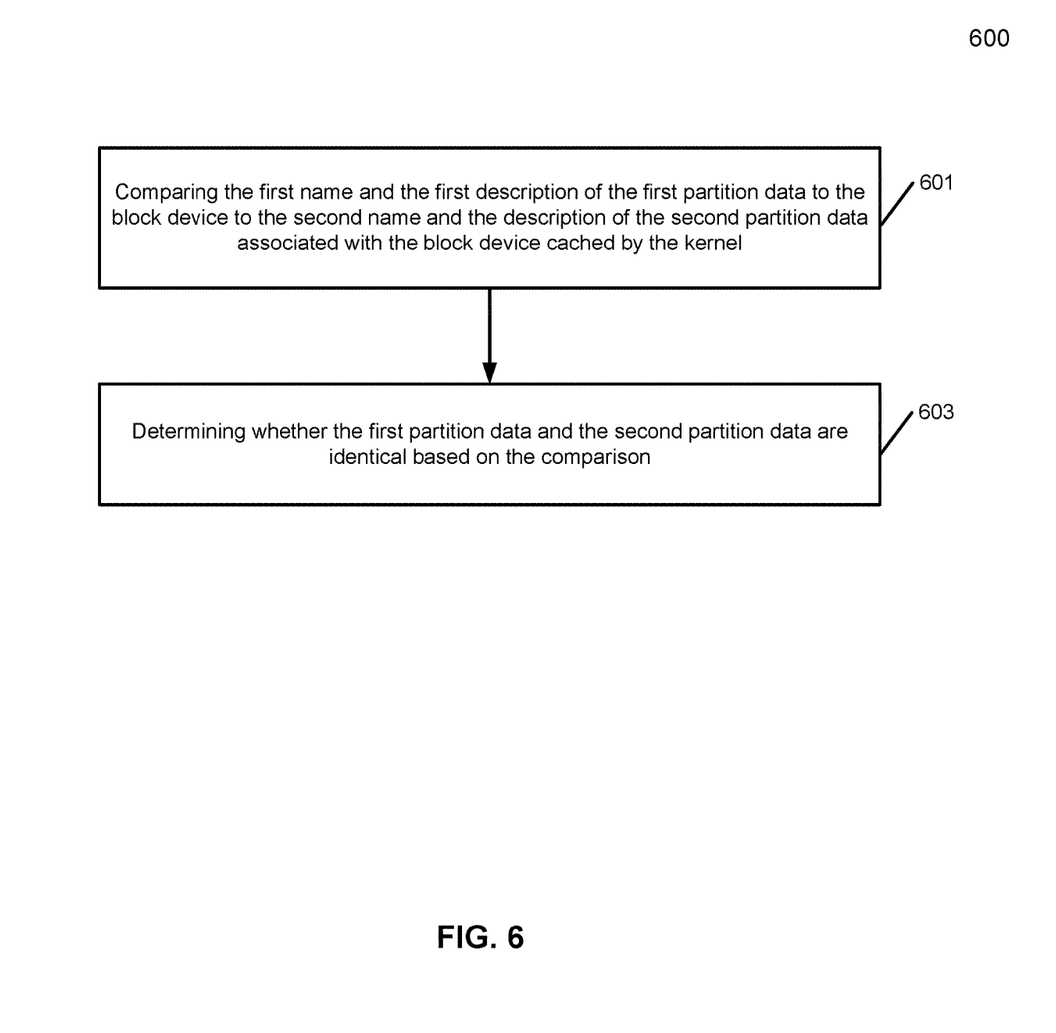
FIG. 6 is a flowchart illustrating a process for a storage management system to perform storage partition rediscovery, according to an embodiment of the application.

FIG. 6 is a flowchart a process for a storage management system to perform storage partition rediscovery, according to an embodiment of the application. In particular, FIG. 6 is a flowchart illustrating a storage management system 600 for optimizing storage partition rediscovery, according to an embodiment of the application.

At operation 601, user device manager 103 compares the first name and the first description of first partition data 123 to block device 121 to the second name and the description of second partition data 115 associated with the block device 121 cached by the kernel 113 according to an embodiment of the application.

Next, at operation 603, user device manager 103 determines whether first partition data 123 and second partition data 115 are identical based on the comparison (e.g., operation 601) according to an embodiment of the application.

Note that some or all of the components and operations as shown and described above (e.g., operations of methods 300-600 illustrated in FIG. 3-6) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
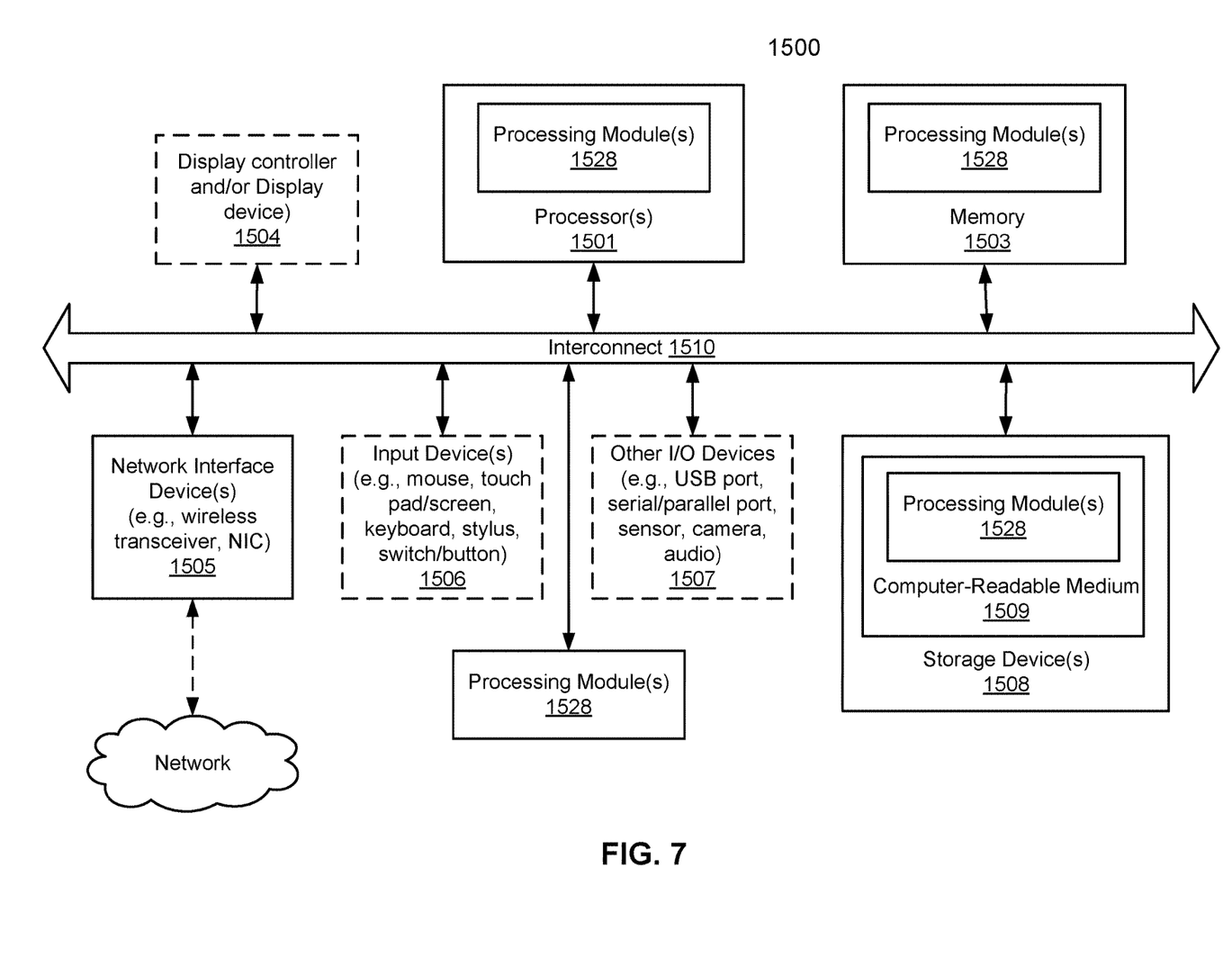
FIG. 7 is a block diagram illustrating a storage management system, according to an embodiment of the application.

FIG. 7 is a block diagram illustrating an example of a data processing system/storage system management center systems which may be used to provide Service for Optimizing Storage Partition Rediscovery with one embodiment of the invention. For example, system 1500 may represent any of data processing/storage system management center systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high-level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
sending, by a user device manager running at a user space of an operating system and executed by a processor, a first request for partition table data to a block device, wherein the user space includes a plurality of user devices and each of the plurality of user devices corresponds to the block device for a user;

receiving, by the user device manager, first partition data of the block device corresponding to the user device;

sending, by the user device manager, a second request for partition data of the block device to a kernel of the operating system;

receiving, by the user device manager, second partition data from the kernel, wherein the second partition data is associated with the block device and the second partition data is cached by the kernel;

determining, by the user device manager, whether the first partition data and the second partition data are identical; and in response to determining that the first partition data is different from the second partition data, performing a device discovery operation on the block device, the device discovery operation including:

performing, by the user device manager, one or more remove-partition-events to modify partition table data of the block device stored in the user space; and performing, by the user device manager, one or more add-partition-events to modify partition table data of the block device stored in the user space.

2. The method of claim 1, further comprising:

in response to determining that the first partition data and the second partition data are identical, skipping the discovery operation on the block device.

3. The method of claim 2, wherein the first partition data includes a first name and first description to the block device.

4. The method of claim 3, wherein the second partition data includes a second name and second description associated with the block device cached by the kernel.

5. The method of claim 4, wherein the determining whether the first partition data and the second partition data are identical further comprises:

comparing the first name and the first description of the first partition data to the block device to the second name and the second description of the second partition data associated with the block device cached by the kernel.

6. The method of claim 5, wherein when the first name and the first description of the first partition data to the block device matches the second name and the second description of the second partition data associated with the block device cached by the kernel based on the comparison, the first partition data and the second partition data are identical.

7. The method of claim 5, wherein when the first name and the first description of the first partition data to the block device do not match the second name and the second description of the second partition data associated with the block device cached by the kernel based on the comparison, the first partition data and the second partition data are not identical.

8. The method of claim 1, wherein performing the device discovery operation on the block device further comprises:

sending BLKRRPART IOCTL to a kernel space to perform the one or more remove-partition-events and the one or more add-partition-events to modify the partition table data to the block device stored in the user space.

9. A non-transitory machine-readable medium having instructions stored therein, which when executed by a processor, cause the processor to perform operations, the operations comprising:

sending, by a user device manager running at a user space of an operating system and executed by a processor, a first request for partition table data to a block device, wherein the user space includes a plurality of user devices and each of the plurality of user devices corresponds to the block device for a user;

receiving, by the user device manager, first partition data of the block device corresponding to the user device;

sending, by the user device manager, a second request for partition data of the block device to a kernel of the operating system;

receiving, by the user device manager, second partition data from the kernel, wherein the second partition data is associated with the block device and the second partition data is cached by the kernel;

determining, by the user device manager, whether the first partition data and the second partition data are identical; and in response to determining that the first partition data is different from the second partition data, performing a device discovery operation on the block device, the device discovery operation including:

performing, by the user device manager, one or more remove-partition-events to modify partition table data of the block device stored in the user space; and performing, by the user device manager, one or more add-partition-events to modify partition table data of the block device stored in the user space.

10. The non-transitory machine-readable medium of claim 9, wherein the operations further comprise:

in response to determining that the first partition data and the second partition data are identical, skipping the discovery operation on the block device.

11. The non-transitory machine-readable medium of claim 9, wherein the first partition data includes a first name and first description to the block device.

12. The non-transitory machine-readable medium of claim 11, wherein the second partition data includes a second name and second description associated with the block device cached by the kernel.

13. The non-transitory machine-readable medium of claim 12, wherein the determining whether the first partition data and the second partition data are identical further comprises:

comparing the first name and the first description of the first partition data to the block device to the second name and the second description of the second partition data associated with the block device cached by the kernel.

14. The non-transitory machine-readable medium of claim 13, wherein when the first name and the first description of the first partition data to the block device matches the second name and the second description of the second partition data associated with the block device cached by the kernel based on the comparison, the first partition data and the second partition data are identical.

15. The non-transitory machine-readable medium of claim 13, wherein when the first name and the first description of the first partition data to the block device do not match the second name and the second description of the second partition data associated with the block device cached by the kernel based on the comparison, the first partition data and the second partition data are not identical.

16. The non-transitory machine-readable medium of claim 9, wherein performing the device discovery operation on the block device further comprises:

sending BLKRRPART IOCTL to a kernel space to perform the one or more remove-partition-events and the one or more add-partition-events to modify the partition table data to the block device stored in the user space.

17. A system, comprising:
   a processor; and
   a memory coupled to the processor to store instructions, which when executed by the processor, cause the processor to perform operations, the operations comprising:
   sending, by a user device manager running at a user space of an operating system and executed by a processor, a first request for partition table data to a block device, wherein the user space includes a plurality of user devices and each of the plurality of user devices corresponds to the block device for a user;
   receiving, by the user device manager, first partition data of the block device corresponding to the user device;
   sending, by the user device manager, a second request for partition data of the block device to a kernel of the operating system;
   receiving, by the user device manager, second partition data from the kernel, wherein the second partition data is associated with the block device and the second partition data is cached by the kernel;
   determining, by the user device manager, whether the first partition data and the second partition data are identical; and
   in response to determining that the first partition data is different from the second partition data, performing a device discovery operation on the block device, the device discovery operation including:
   performing, by the user device manager, one or more remove-partition-events to modify partition table data of the block device stored in the user space; and
   performing, by the user device manager, one or more add-partition-events to modify partition table data of the block device stored in the user space.

18. The system of claim 17, wherein the operations further comprise:
   in response to determining that the first partition data and the second partition data are identical, skipping the discovery operation on the block device.

19. The system of claim 17, wherein the first partition data includes a first name and first description to the block device.

20. The system of claim 17, wherein the second partition data includes a second name and second description associated with the block device cached by the kernel.

* * * * *